March 22, 1960 J. L. HOLLIS 2,929,435
METHOD AND APPARATUS FOR SEATING REINFORCING
MEMBERS IN RUBBERIZED FABRIC STRUCTURES
Filed Dec. 14, 1956 2 Sheets-Sheet 1

INVENTOR.
JACK L. HOLLIS
BY
*W. A. Fraser*
ATTY.

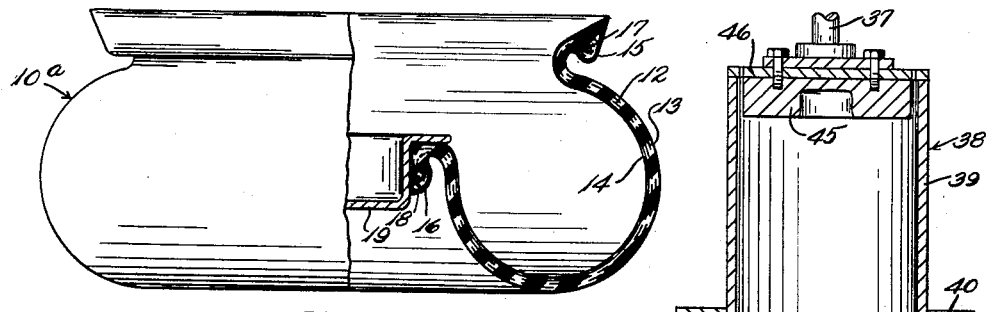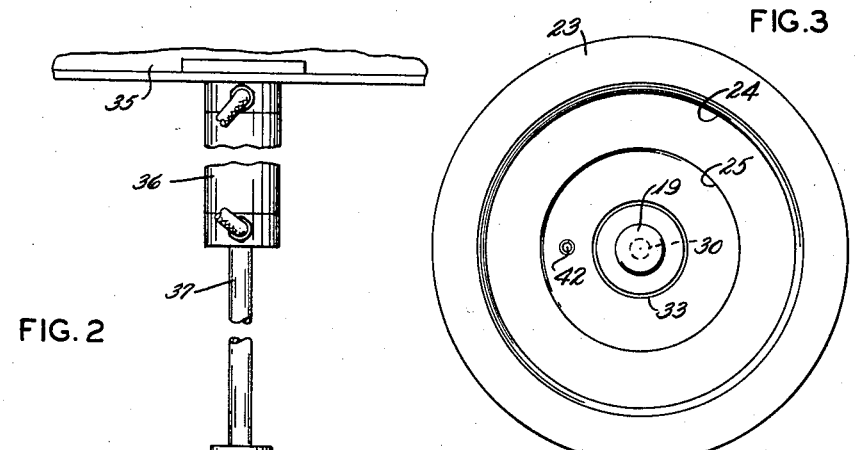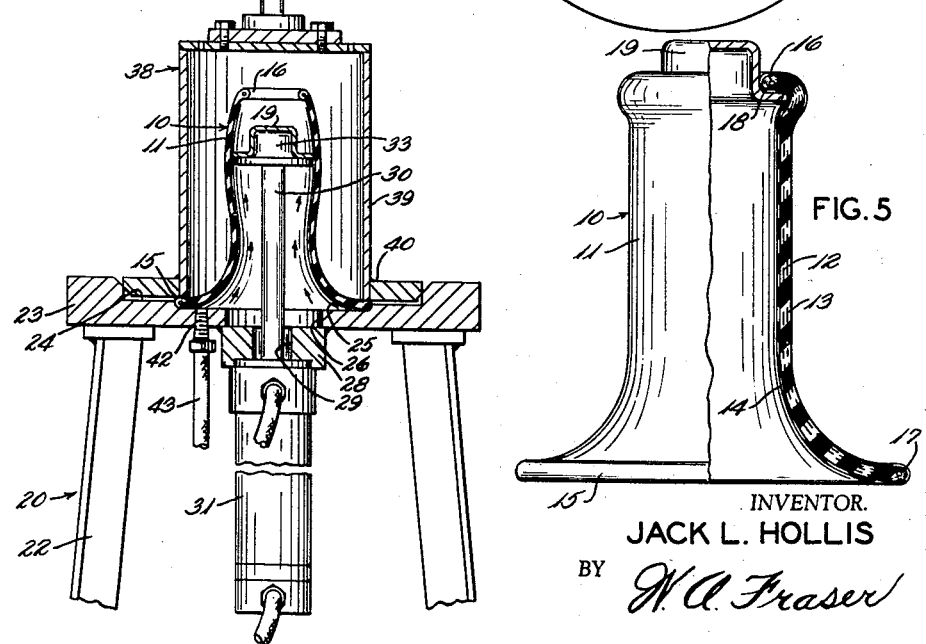

United States Patent Office 2,929,435
Patented Mar. 22, 1960

2,929,435

METHOD AND APPARATUS FOR SEATING REINFORCING MEMBERS IN RUBBERIZED FABRIC STRUCTURES

Jack L. Hollis, Akron, Ohio, assignor to The Firestone Tire & Rubber Company, Akron, Ohio, a corporation of Ohio Application December 14, 1956, Serial No. 628,367

12 Claims. (Cl. 154—1)

The present invention relates to method and apparatus for use in the manufacture of rubberized fabric articles. More particularly, the present invention relates to method and apparatus for seating reinforcing members in rubberized fabric structures. Specifically, the invention relates to the seating, preferably so as to form a fluid tight seal, of a reinforcing closure element within one end of a tubular rubberized fabric structure having open ends of materially different diameters.

In the manufacture of many rubberized fabric articles it is necessary to incorporate therein as an integral part of the cured and finished article, reinforcing or strengthening members located at critical points of wear or applying loads. For example, in the manufacture of single convolution air spring bellows suitable for use in the suspension system of a vehicle, it is desirable to provide reinforcement at the point of contact of the air spring with the vehicle road gear. Such reinforcing members if seated at one end of an uncured air spring bellows in a fluid tight manner, also provide a closure for one end of the bellows, and facilitate the final shaping and curing (vulcanization) of the bellows.

In the course of manufacturing air spring bellows, the first stage of manufacture involves the build up or assembly on a suitable mandrel of a tube having multiple plies of rubberized fabric with cords which preferably extend at an angle of about 5°–25° to the axis of the bellows, the cords of one ply crossing the cords of the other. The interior of the bellows has a soft lining of rubber, preferably neoprene because of its oil resistant properties, to retain air within the bellows. The ends of the plies are wrapped about and anchored to circular beads of materially different diameters so that in the cured bellows, one bead can pass through the other during the working stroke of the bellows. The uncured bellows is substantially frusto-conical in shape and has beads of different diameters around its open ends.

The reinforcing closure or disk is required to be seated within the uncured bellows at the narrow end. The disk is fluid impermeable and may be metallic, though hard rubber or high strength plastic could also be used. To provide effective reinforcement and sealing the substantially rigid disk must fit tightly within the smaller bead of the uncured bellows. However, the disk must be inserted in such a manner that the rubberized fabric cords will not be injured or unduly stretched nor the rubber lining abraded or scored. In the particular case of an air spring bellows, the reinforcing disk is cup-shaped and has an outer annular flange having a diameter significantly in excess of the internal diameter of the bead at the narrow end of the uncured bellows.

In the final stage of manufacture, the uncured bellows with the reinforcing disk in place is subjected to fluid pressure at elevated temperatures so as to shape and cure the bellows in its finished form. As a part of the shaping and curing operation, steam, or other suitable fluids under considerable pressure, is introduced into the interior of the bellows. By "cold pressing" the reinforcing disk in the narrow end of the uncured bellows to make a fluid-tight seal, there is no possibility of injury to the narrow end of the bellows due to the escape of steam. Such injury, often referred to as "blistering" is of an erosive nature and often is sufficient to require rejection of a finished bellows.

Therefore, it is an object of the invention to provide improvements in method and apparatus for use in the building, preparation for shaping and curing of rubberized fabric articles.

Further, it is an object of the invention to provide improvements in method and apparatus for inserting, locating and seating a reinforcing closure in the interior of a rubberized fabric structure.

Still further, it is an object to provide improved method and apparatus for inserting, locating and seating a reinforcing and sealing disk within a tubular rubberized fabric structure having open ends of materially different diameters.

These and other objects of the invention will be apparent in view of the following detailed description of the invention taken in conjunction with the attached drawings.

In the drawings:

Fig. 2 is a view similar to Fig. 1, showing the apparatus in operation with the disk partially inserted within the uncured bellows;

Fig. 3 is a plan view in section taken substantially on line 3—3 of Fig. 1;

Fig. 4 is an enlarged view in section, of a modification of the apparatus of Figs. 1 and 2 intended for "cold pressing" the reinforcing disk within the narrow end of the uncured bellows;

Fig. 5 is a sectional view, partially cut away, of an uncured bellows with the reinforcing disk in position at the narrow end thereof;

Fig. 6 is a sectional view of a shaped and cured air spring bellows in finished form.

Figure 1:
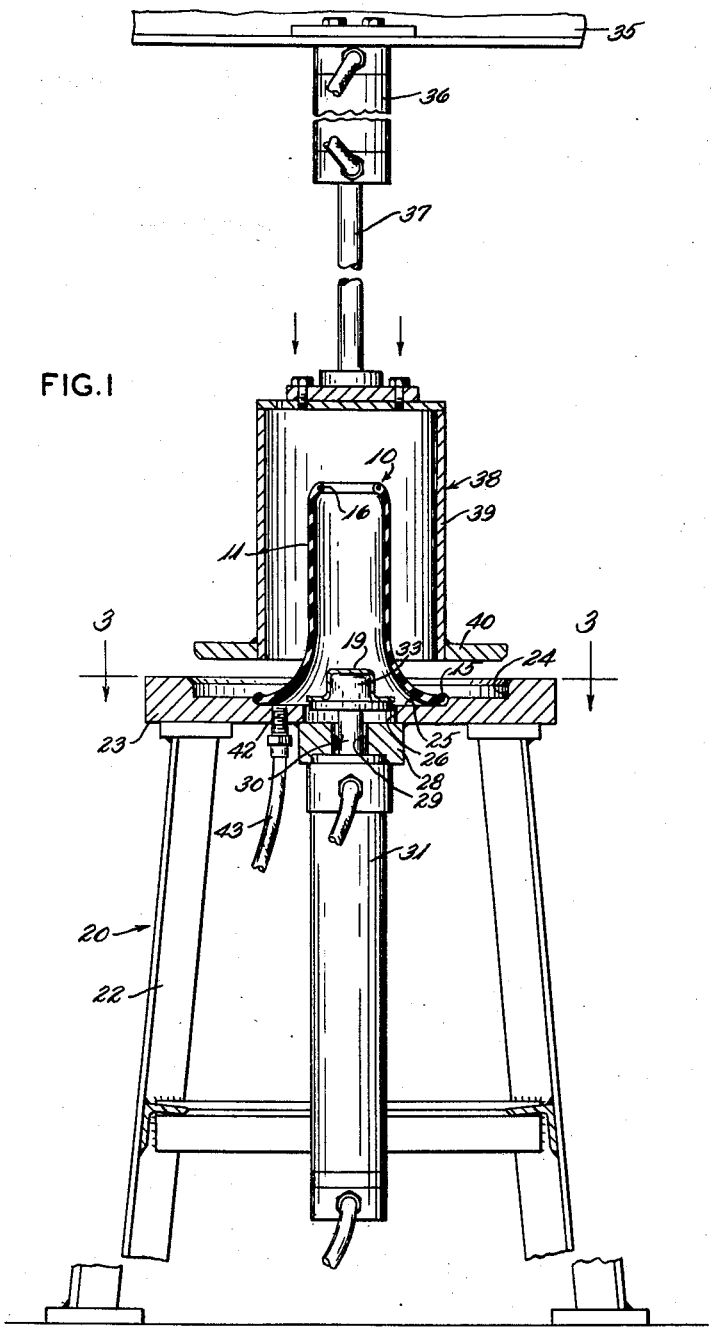
Fig. 1 is a vertical sectional view of apparatus according to the invention, showing a reinforcing closure disk in position to be inserted within the uncured bellows.

The invention includes the concurrent and successive application of mechanical and fluid forces to insert, locate and seat a reinforcing closure disk within the smaller end of a rubberized fabric structure indicated generally by the numeral 10. Referring to Fig. 5, the body 11 of the structure 10 is preferably of two plies 12 and 13 of rubberized fabric and has a rubber lining 14. The fabric cords of the plies cross each other and are at angles of about 5°–25° to the longitudinal axis of the body 11. The ends of the plies are wrapped about and anchored to a pair of circular beads 15 and 16 which are reinforced by cores 17 and 18, respectively, of steel wire.

Referring to Fig. 6, the top bead 15 of one form of a finished bellows, indicated generally at 10A, is adapted to be fixed securely to the frame (not shown) of a vehicle and has an external diameter of about 5¾". The bottom bead 16, reinforced and closed by a disk 19, has an external diameter of about 2¾" and an internal diameter of about 1¾". The outer diameter of the disk 19 will be about 2⅞".

Referring to Figs. 1 and 2, apparatus according to the invention is indicated generally by the numeral 20. The apparatus includes a base frame 22 which is attached by suitable means to the floor or foundation. Atop the base 22 is a clamp and support plate 23 having a large diameter recess 24 and a slightly smaller diameter recess 25, concentric with recess 24. Concentric with recess 25, the plate 23 has an axial bore 26.

Secured to the underside of plate 23, in alignment with the bore 26, is a cylinder mounting block 28 having an axial bore 29 through which the piston rod 30 of a pneumatic cylinder 31 is reciprocably operable in a vertical plane. The cylinder 31, which is attached by suitable means to the block 28, has a piston preferably cushioned at both ends of its stroke, and is operative to raise and lower an insertion cap or ram 33 affixed to the end of the piston rod 30. The cap 33, which normally rests atop the block 28 within the bore 26, has an upper surface which corresponds generally with the under surface of a reinforcing disk 19 and thus has a raised center and a peripheral flange portion.

Above the base 22, is a structural frame or press member 35. Depending from the frame 35, preferably in axial alignment with the cylinder 31, is a second similar pneumatic cylinder 36, having a depending piston rod 37, also reciprocable in a vertical plane. Affixed to the lower end of the piston rod is a cylindrical member 38 which functions as a clamping means to hold an uncured bellows 10 in position on the plate 23 and as a sealing means to prevent the escape of fluid pressure, as described below, from around the edges of the bead 15.

The member 38 includes a preferably vented cylindrical body portion 39 terminating in a heavy annular ring 40. The ring 40 is preferably slightly beveled on the lower outer diameter thereof and will fit snugly within the recess 24 and in contact with the bead 15 of an uncured bellows which is positioned within the smaller recess 25. When lowered by the extension of the piston rod 37, the ring 40 of member 38 clamps and seals the bead 15 during the ensuing operations.

As best shown in Fig. 3, extending upwardly through the bottom of plate 23, within the groove 25, is a port 42. This port serves to admit compressed air or other suitable fluid pressure media, supplied by piping 43 from a source of air under pressure (not shown) into the interior of the uncured bellows structure 10.

Referring to Fig. 4, the cylindrical member 38 may be modified to include a die 45 affixed to the underside of the upper end 46 of the cylinder 39, in concentric alignment with the ram 33. The die 45 is shaped so as to conform generally with the outer end of the bellows 10 and serves to back up the narrow end of the bellows when the piston rod 30 is extended and the ram 33 and reinforcing disk 19 forced into contact with the bead 16. The use of the member 38 without a back up die 45 will produce a seal between the bellows and cup which is fluid tight at relatively low pressures. However, the use of the die 45 in cooperation with the ram 33 will produce a seal which is fluid tight at the pressures normally employed during the final shaping and curing of the bellows.

The operation of the apparatus 20 is as follows:

A disk 19 is placed upon the ram 33. An uncured bellows 10 is then placed upon the support plate 23 with the larger bead 15 downward. The recess 25 centers the bellows 10 upon the plate 23. The clamping and sealing member 38 is then lowered over the positioned bellows 10 so that the ring 40 contacts and seats the bead 15 within the recess 25. While the bellows is so held, the cylinder 31 is actuated so that the piston rod 30 begins to extend upwardly within the bellows 10. Concurrently with the extension of the piston rod 30, air is supplied through the piping 43 and port 42 into the interior of the bellows.

The concurrent supplying of air and the raising of the piston rod is controlled by suitable means (not shown) and causes the walls of the bellows 10 to distend radially, the disk 19 functioning somewhat in the manner of a free piston. Because of this radial distention, the disk 19 is seated against the bead 16 without injury to the fabric plies 12 and 13 or the inner rubber layer 14. Fig. 1 shows the apparatus prior to the final lowering of the clamping member 38. Fig. 2 shows the condition of the apparatus, after the supplying of air and the raising of the piston rod, the walls of the bellows 10 being distended as the disk 19 has been raised about three-quarters of the distance to its final location. In addition to permitting the passage of the somewhat larger diameter disk 19 through the bellows 10, the distention of the walls of the bellows will break or stretch the pick cords in the plies 12 and 13 and thus facilitate even expansion of the convoluted portion of the bellows 10A during final shaping and curing.

If it is desired to cold press the disk 19 in the bead 18, the application of fluid pressure is discontinued by suitable control means (not shown) when the disk reaches the bead. However, the application of mechanical force by the cylinder 31 is continued, preferably against a back up means such as the die 45, for a predetermined period of time until the rubber coating of the fabric plies 12 and 13, and the liner 14 flows and forms a fluid tight seal with the disk 19.

Modifications of the apparatus of the invention will be readily apparent to those skilled in the art. For example, if cold pressing is not desired, the frame 35 and cylinder 36 could be replaced with manual clamps on the plate 23 for securing the clamping and sealing member 38 in position. Other such changes within the scope of the invention also suggest themselves. Therefore, the subjoined claims are intended to cover all such changes and modifications as lie within the true spirit and scope of the invention.

What is claimed is:

1. The method of manufacturing an air spring having different diameter beads at the ends and a closure disk seated within the smaller bead comprising, assembling a plurality of rubberized fabric plies to form a body terminating in said beads and having a tubular portion of substantial length and a diameter substantially the same as that of the disk, introducing said disk into said air spring through said larger bead, and passing said disk through said tubular portion while introducing air under pressure behind said disk to inflate said air spring radially at said disk to facilitate its passage through said tubular portion.

2. A method of seating a reinforcing member in the interior of a tubular rubberized fabric structure having ends of different diameters comprising the steps of, holding one end of said structure, moving said reinforcing member axially through said structure, concurrently applying fluid pressure interiorly of said structure to distend it radially until said member is seated within said structure, and continuing to apply fluid pressure until said structure and member form a fluid tight seal.

3. A method of seating a reinforcing member in the interior of a rubberized fabric structure having ends of different diameters comprising the steps of, holding one end of said structure, moving said reinforcing member axially through said structure, and concurrently applying fluid pressure interiorly of said structure to distend it radially until said member is seated with said structure.

4. A method of seating a reinforcing member in the interior of a rubberized fabric structure having ends of different diameters comprising the steps of, holding the larger diameter end of said structure, moving said reinforcing member axially through said structure from said larger diameter end, and concurrently applying fluid pressure behind said reinforcing member to radially distend said structure until said member is seated.

5. In a method of manufacturing a tubular article of rubberized fabric having different diameter beads at the ends and a closure disk seated within the smaller bead, a portion of said disk having a diameter greater than the internal diameter of the smaller bead, the steps of inserting said disk through the larger end of the article and moving it toward the smaller end, and concurrently introducing air under pressure into the larger end to distend the article radially around the moving disk.

6. In a method of manufacturing a tubular article of rubberized fabric having different diameter beads at the ends and a closure disk seated within the smaller bead, a portion of said disk having a diameter greater than the internal diameter of the smaller bead, the steps of inserting said disk through the larger end of the article and moving it toward the smaller end, and concurrently introducing air under pressure into the larger end to distend the article radially around the moving disk, and cold pressing said disk within said smaller end to form a fluid tight seal with said smaller bead.

7. In a method of manufacturing a tubular article of rubberized fabric having different diameter beads at the ends and a closure disk seated within the smaller bead, a portion of said disk having a diameter greater than the internal diameter of the smaller bead, the steps of clamping the larger diameter end of said article concentric of said disk, inserting said disk through the larger end of the article and moving it toward the smaller end, and concurrently introducing air under pressure into the larger end to distend the article radially around the moving disk.

8. In a method of manufacturing a tubular article of rubberized fabric having different diameter beads at the ends and a closure disk seated within the smaller bead, a portion of said disk having a diameter greater than the internal diameter of the smaller bead, the steps of clamping the larger diameter end of said article concentric of said disk, inserting said disk through the larger end of the article and moving it toward the smaller end, and concurrently introducing air under pressure into the larger end to distend the article radially around the moving disk, and cold pressing said disk within said smaller end to form a fluid tight seal with said smaller bead.

9. Apparatus for seating a reinforcing member within the narrow end of a rubberized fabric structure having a tubular form with open ends of materially different diameters comprising, a base for supporting the larger diameter end of said structure, a ram movable within said base for supporting said reinforcing member concentrically of said structure, pressure means for extending said ram and member axially within said structure, a clamp ring for holding said structure against said base, and means for applying fluid pressure behind said member to cause said structure to be radially distended as said pressure means moves said ram toward the smaller diameter end of said structure.

10. Apparatus for seating a reinforcing member within the narrow end of a rubberized fabric structure having a tubular form with open ends of materially different diameters comprising, a base for supporting the larger diameter end of said structure, a ram movable within said base for supporting said reinforcing member concentrically of said structure, pressure means for extending said ram and member axially within said structure, a clamp ring for holding said structure against said base, a pressure back up means affixed to said clamp ring and contacting the exterior of the smaller diameter end of said structure, and means for applying fluid pressure behind said member to cause said structure to be radially distended as said pressure means moves said ram toward the smaller diameter end of said structure.

11. Apparatus for seating an annular disk within the smaller diameter end of an uncured air spring bellows having a tubular form with open ends of materially different diameters, comprising, a base for supporting the larger diameter end of said structure, a ram movable in said base for supporting a disk placed thereon concentrically of said bellows, a first pressure means affixed to said base for extending said ram and said disk axially within said structure, a clamp ring contacting the bellows upon the base, a second pressure means above said base for holding said ring in contact with said bellows, and means for applying fluid pressure behind said disk to cause said bellows to be radially distended as said first pressure means extends said ram and disk toward the smaller diameter end of said structure.

12. Apparatus for seating an annular disk within the smaller diameter end of an uncured air spring bellows having a tubular form with open ends of materially different diameters, comprising, a base for supporting the larger diameter end of said structure, a ram movable in said base for supporting a disk placed thereon concentrically of said bellows, a first pressure means affixed to said base for extending said ram and said disk axially within said structure, a clamp ring contacting the bellows upon the base, a pressure back up means affixed to said clamp ring for contacting the exterior surface of the smaller diameter end of said bellows, a second pressure means for holding said ring and back up means in contact with said bellows, and means for applying fluid pressure behind said disk to cause said bellows to be radially distended as said first pressure means extends said ram and disk toward the smaller diameter end of said structure.

References Cited in the file of this patent

UNITED STATES PATENTS

| | | |
|---|---|---|
| 1,282,160 | Young | Oct. 22, 1918 |
| 1,708,828 | Bremmerman | Apr. 9, 1929 |
| 2,099,843 | Connell | Nov. 23, 1937 |
| 2,263,815 | Northup et al. | Nov. 25, 1941 |
| 2,321,340 | Waterbury | June 8, 1943 |
| 2,409,486 | Hagen et al. | Oct. 15, 1946 |
| 2,644,198 | Crawford | July 7, 1953 |
| 2,745,778 | Garten | May 15, 1956 |
| 2,779,996 | Tanis | Feb. 5, 1957 |
| 2,848,956 | Deist | Aug. 26, 1958 |
| 2,874,458 | Smith | Feb. 24, 1959 |

FOREIGN PATENTS

| | | |
|---|---|---|
| 978,163 | France | Nov. 22, 1950 |

OTHER REFERENCES

Automotive Industries, "Air Springs," Dec. 15, 1957, pages 54–77.